US011370687B2

(12) United States Patent
Tijerina Ramos et al.

(10) Patent No.: US 11,370,687 B2
(45) Date of Patent: Jun. 28, 2022

(54) TAKEOUT MECHANISM FOR MACHINES FOR FORMING GLASS OBJECTS

(71) Applicant: Vitro, S.A.B. de C.V., Monterrey (MX)

(72) Inventors: Victor Tijerina Ramos, Monterrey (MX); Luis Martín Hernandez Chavez, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 376 days.

(21) Appl. No.: 16/495,553

(22) PCT Filed: Aug. 2, 2017

(86) PCT No.: PCT/MX2017/000089
§ 371 (c)(1),
(2) Date: Sep. 19, 2019

(87) PCT Pub. No.: WO2018/174704
PCT Pub. Date: Sep. 27, 2018

(65) Prior Publication Data
US 2020/0087189 A1    Mar. 19, 2020

(30) Foreign Application Priority Data

Mar. 23, 2017  (AR) .............................. 20170100724

(51) Int. Cl.
*C03B 9/447*     (2006.01)
*C03B 9/40*      (2006.01)
*B65G 47/82*     (2006.01)

(52) U.S. Cl.
CPC ............. *C03B 9/447* (2013.01); *B65G 47/82* (2013.01); *C03B 9/40* (2013.01)

(58) Field of Classification Search
CPC ................... C03B 9/44–9/447; C03B 35/125
See application file for complete search history.

(56) References Cited

U.S. PATENT DOCUMENTS 3,095,082 A * 6/1963 Allgeyer ................. C03B 9/447
198/412
3,220,566 A * 11/1965 Rowe ...................... C03B 9/447
414/733

(Continued)

FOREIGN PATENT DOCUMENTS

AR         107961 A1    7/2018
CN         1064666 A    9/1992

(Continued)

*Primary Examiner* — Erin Snelting
(74) *Attorney, Agent, or Firm* — The Webb Law Firm

(57) ABSTRACT

A takeout mechanism for glassware forming machines includes: a supporting structure; an oscillating arm connected by a first end, in pivot form, to a movement transmission system to move the oscillating arm with an angular movement; and, a takeout tong head coupled at a second end of the oscillating arm. The oscillating arm comprises a hollow housing, a first fixed shaft coupled at the first end of the housing; first cam means coupled to the first fixed axis; a second rotating shaft coupled at the second end of the housing, spaced parallel to the first shaft, one end being coupled to the takeout tong head; second cam means coupled to the second rotating axis; and linkage means pivotally connecting the first cam means of said first fixed axis and said second cam means of said second rotating axis.

8 Claims, 7 Drawing Sheets

(56) References Cited

U.S. PATENT DOCUMENTS

| | | | |
|---|---|---|---|
| 4,203,752 | A | 5/1980 | Becker et al. |
| 4,525,195 | A | 6/1985 | Foster |
| 4,983,202 | A | 1/1991 | Deb et al. |
| 5,271,757 | A | 12/1993 | Houben et al. |
| 6,722,488 | B2 | 4/2004 | Gerber et al. |
| 6,848,273 | B2 | 2/2005 | Leidy et al. |
| 6,966,428 | B1 | 11/2005 | Flynn |
| 7,063,498 | B1 | 6/2006 | DiFrank et al. |
| 2020/0087189 | A1 | 3/2020 | Tijerina Ramos et al. |

FOREIGN PATENT DOCUMENTS

| | | | |
|---|---|---|---|
| CN | 1138012 | A | 12/1996 |
| DE | 69116026 | T2 | 5/1996 |
| EP | 0134720 | A1 | 3/1985 |
| GB | 2134510 | A | 8/1984 |
| GB | 2232151 | A | 12/1990 |
| JP | S55158142 | A | 12/1980 |

\* cited by examiner

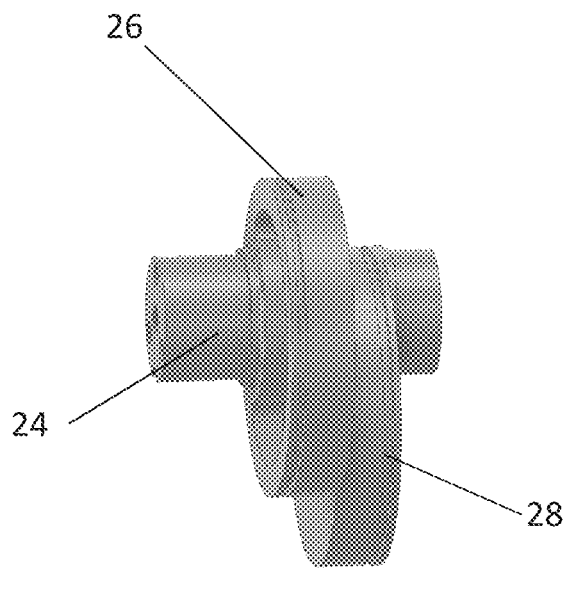
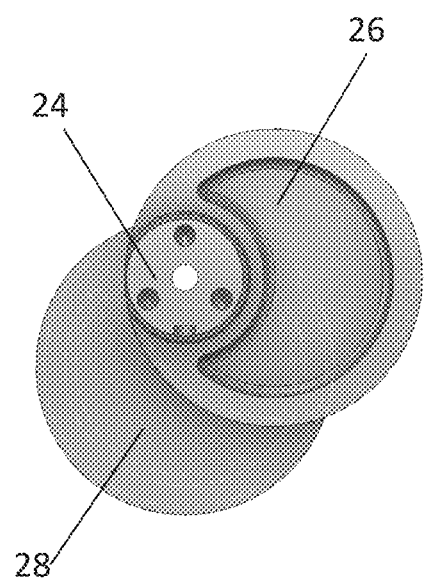
FIGURE 10A　　　　FIGURE 10B
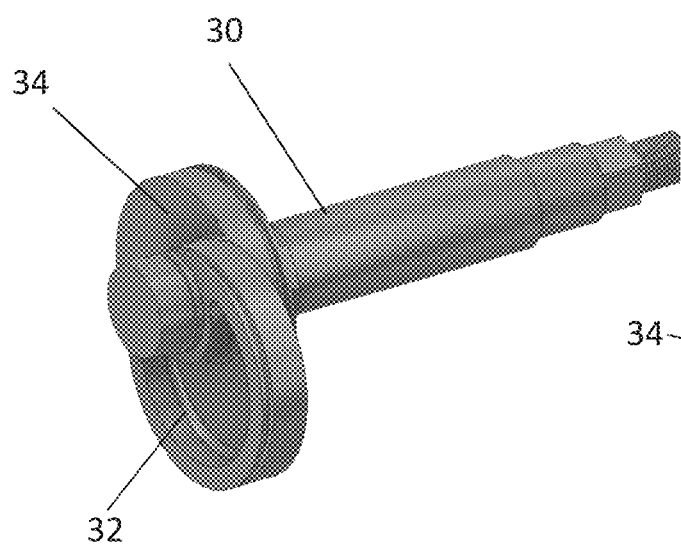
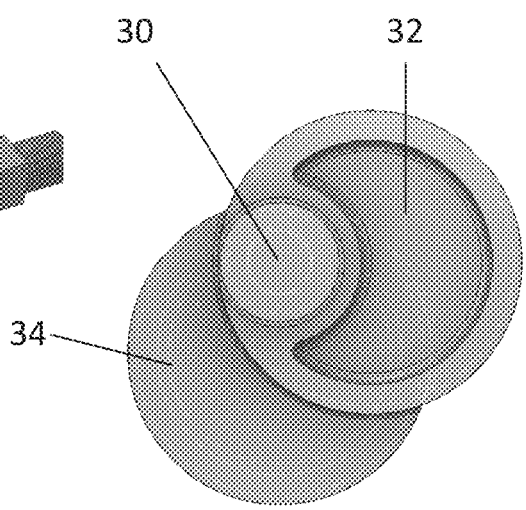
FIGURE 11A　　　　FIGURE 11B

TAKEOUT MECHANISM FOR MACHINES FOR FORMING GLASS OBJECTS

CROSS-REFERENCE TO RELATED APPLICATIONS

This application is the United States national phase of International Application No. PCT/MX2017/000089 filed Aug. 2, 2017, and claims priority to Argentina Patent Application No. 20170100724 filed Mar. 23, 2017, the disclosures of which are hereby incorporated by reference in their entirety.

FIELD OF THE INVENTION

The present invention refers to the glassware manufacture and more particularly, to a takeout mechanism for glassware forming machines.

BACKGROUND OF THE INVENTION

In the manufacturing process of glassware, such as by the press-blow, blow-blow process, a gob of molten glass is fed by each section of the machine, for example the I.S. type in which it is necessary to form, in a blank mold, a container or parison preform, in an inverted position, also forming the crown of the container and, subsequently, invert the preform to its normal position, in a second mold, where a final blow is received conforming the final desired shape container.

Once the final blow has taken place, a takeout mechanism transfers the newly formed containers from the blow mold to a cooling plate where the container receives an initial cooling. The container is then transported by means of a 90° pusher on a conveyor belt moving towards an annealing furnace, where all thermal stresses that the container has suffered during its manufacturing process is removed.

The glassware takeout mechanisms are well known in the glass industry, especially to be used in I.S. (individual sections) forming machines. They consist mainly of an oscillating arm that is pivoted on one of its ends on a supporting structure that is located in the front of the machine and that moves to oscillate angularly from a position of the blow mold or final finish of the container to a cooling plate position. A takeout head assembly rests on the free end of the oscillating arm and moves in a relationship that is dependent on the oscillatory movement of the said arm. The takeout head assembly includes at least one pair of tongs that simultaneously open and close to transfer the container from the final blow mold to a cooling plate.

There are several types of glassware mold takeout mechanisms, for example, U.S. Pat. No. 4,525,195 of Thomas Foster, describes a take-out mechanism which comprises a tong carrier movable in an arcuate path between a position at which tongs carried by the carrier can grip an article and a second position at which the tongs release the article on to a dead plate of the machine. A piston and cylinder assembly provides cushioning means operable to oppose the movement of the carrier as it approaches its second position to thereby reduce any impact between the articles and the dead plate.

U.S. Pat. No. 5,271,757 of Heinz Houben, et al, refers to a takeout mechanism for a glassware forming machine comprises a parallel linkage for effecting movement of the takeout tongs. To enable adjustment of the position of the takeout tongs, the position of one of the fixed pivots of the parallel linkage may be adjusted.

Another example of takeout is shown in U.S. Pat. No. 6,848,273 by Leidy D. Wayne, et al, which describes combined blowhead and takeout mechanisms to sequentially blow glass parisons into containers in a mold set and to transfer blown containers to a deadplate of a glass containing forming machine. Each of the combined mechanisms is pivotally suspended about an axis A from a carrier arm that is pivotally attached to an end of an oscillating arm. An opposed end of which is pivoted about an axis B. The axis B of each combined blowhead and takeout mechanism is periodically raised and lowered to permit the other combined blowhead and takeout mechanism to oscillate thereebeneath, to thereby permit overlapping cycles between the blowhead and takeout mechanisms. Each blowhead and takeout mechanism is provided with a chuck or tong assembly to engage or release each container by its finish. Each tong assembly has a plurality of tong elements that are simultaneously moved radially in or out by oscillation of a cam that has a non-circular slot in which a pin carried by each tong element rides.

Although the article takeout mechanisms work properly, one of the critical parts of these takeout mechanisms is the oscillating arm, which moves with an angular movement of 180°, between the position of the final mold of the glass article to a front position towards a cooling plate.

Normally, this oscillating arm executes its movement with the support of a series of gears, or a transmission by chain gear or by gears and toothed pulleys. However, due to high production runs, the elements are worn out or become out of adjustment (due to the effect of heat), which causes the takeout head to be misaligned and lose its vertical position when the article is removed from the mold.

Due to this misalignment, when the article is removed from the mold, the halves of the fingers of the takeout head will make contact at different heights of the article, which, because it is still in a hot state, causes marks around the neck of the article or a possible slitting of the article.

When this happens, it is necessary to stop the machine section to adjust the belt or sprocket chain of the oscillating arm. However, due to gear wear, it is not possible to accurately adjust or eliminate the clearance that exists in the gears.

Therefore, the present invention refers to a takeout mechanism for glassware forming machines, which simplifies the components of the oscillating arm by using a system of eccentric connecting rods and cams to provide a greater contact surface, reducing wear between the parts by distributing the load over a larger circumferential space.

This type of arrangement keeps wear to a minimum, which means that the takeout mechanism is perfectly aligned when removing the article from the mold, and moved with an angular movement from 0° to 180° towards the front of the machine.

OBJECTIVES OF THE INVENTION

Therefore, it is a first objective of the present invention, to provide a takeout mechanism for glassware forming machines, whose oscillating arm is composed of an eccentric connecting rods and cams system reducing the wear, making the movement of the mechanism more accurate.

Another objective of the present invention is to provide a takeout mechanism for glassware forming machines, which reduces the wear between the parts, by distributing the load in a greater circumferential space.

An further objective of the present invention is to provide a takeout mechanism for glassware forming machines, which maintains the alignment of the height of the takeout/blowhead with respect to the mold and glass articles.

An additional objective of the takeout mechanism for a glassware forming machine, which utilizes a double-envelope transmission system (worm screw and gear wrap around each other), considerably increasing the load capacity by providing more contact with the tooth area and more teeth in mesh than any other worm screw design.

These and other objectives and advantages of the present invention, will be evident to the experts in the field of the following detailed description of the invention, that will be made with reference to the drawings accompanied as an illustration of it, which will be considered including but not limited to the present invention.

BRIEF DESCRIPTION OF THE DRAWINGS

FIGS. 10A and 10B, show a side view and a front view of a first eccentric to provide movement to the takeout mechanism for glassware forming machines in accordance with the present invention; and, FIGS. 11A and 11B, show a side view and a front view of a second eccentric to provide movement to the takeout mechanism for glassware forming machines in accordance with the present invention.

DETAILED DESCRIPTION OF THE INVENTION

The takeout mechanism for glassware forming machines, in accordance with the present invention, will be described below, making reference to the drawings accompanied as an illustration of this one, where the same numbers refer to the same parts of the figures shown.

Figure 1:
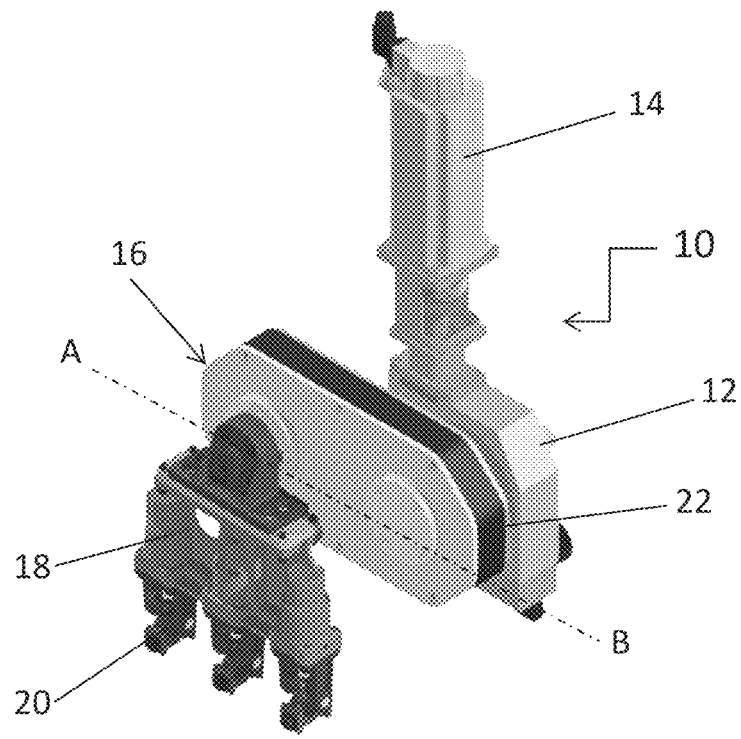
FIG. 1 is a conventional perspective view, showing a takeout mechanism for glassware forming machines in accordance with the present invention.

FIG. 1 shows a takeout mechanism 10 for glassware forming machines including: a supporting structure 12; a servo motor 14 coupled to the supporting structure 12; an oscillating arm 16, which is connected to rotate for a first end in supporting structure 12. This oscillating arm 16 being connected with the servomotor 14, which will be described in more detail later, which moves with an angular movement of 180°, between a first position A, for example, in the position of the mold from the final glassware forming machine to a front position B, towards the front of the glassware forming machine.

A takeout tong head 18 that has tongs or fingers 20, these tongs or fingers 20 having an opening and closing movement to execute the clamping and release steps of articles (not shown), during the forming process of the same. The takeout tong head 18 being coupled by its top part with the free end of the oscillating arm 16, and moves in a relation dependent on the oscillatory movement of this arm 16.

Figure 2:
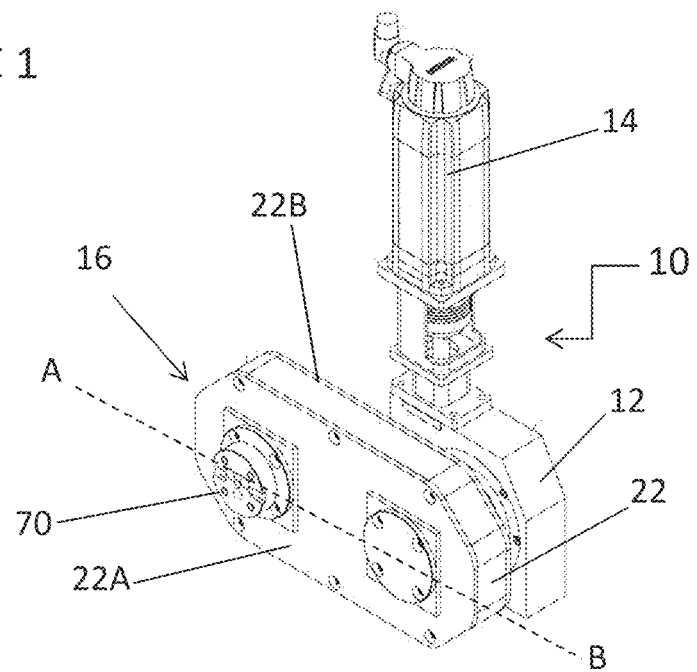
FIG. 2 is a conventional perspective, showing a takeout mechanism for glassware forming machines—without a blowhead—according to the present invention.
Figure 3:
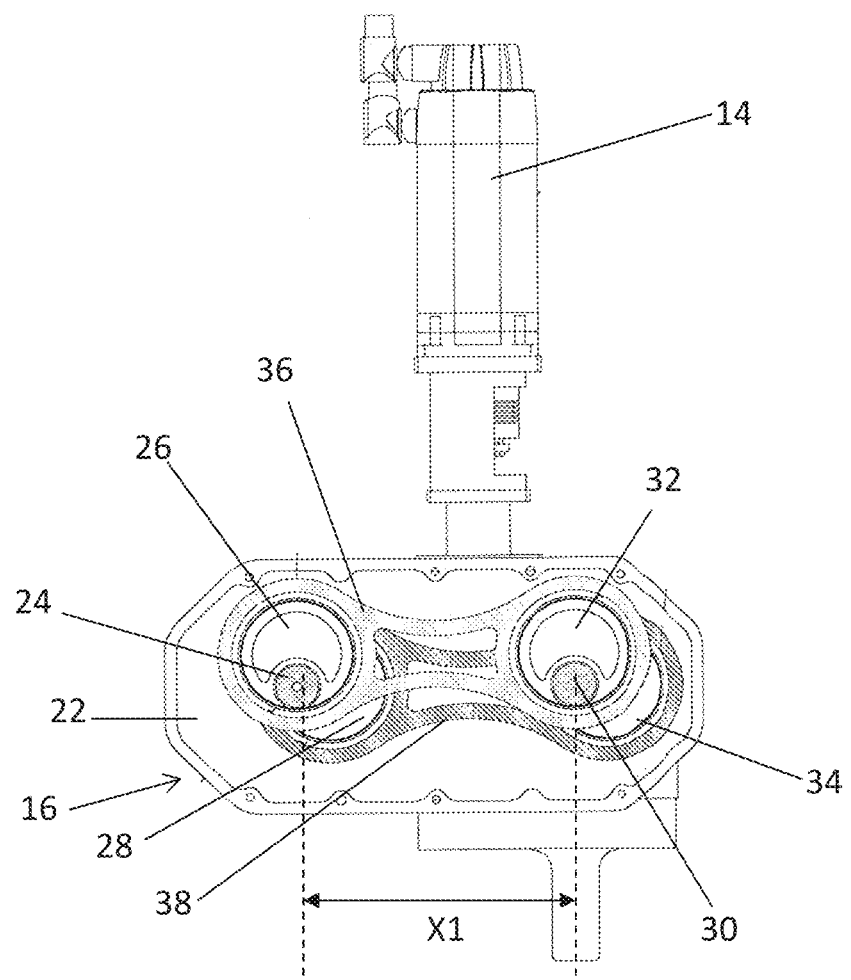
FIG. 3 is a side view, showing the inside of the takeout mechanism for glassware forming machines in accordance with this invention.
Figure 4:
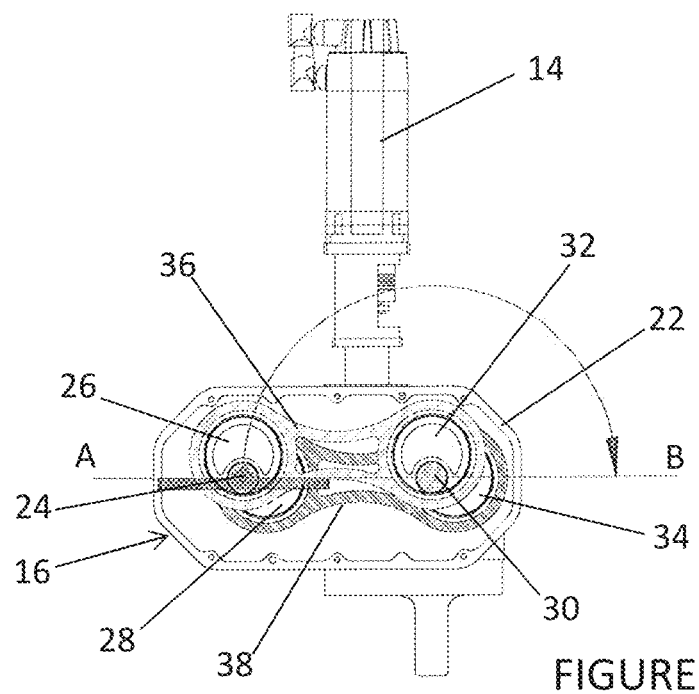
FIGS. 4 to 7 show, in side views, the sequence of movement of the takeout mechanism for glassware forming machines with an angular movement from 0° to 180° towards the front of the machine and its return in inverse direction, in accordance with the present invention.

FIG. 2 shows in a perspective view, the article takeout mechanism 10, without the coupling of the takeout tong head 18, and showing a coupling head 70 only that rotates on its own axis to move the takeout tong head 18.

Referring now to FIGS. 2 to 7, the oscillating arm 16 includes a housing 22, which has a front wall 22A and a rear wall 22B; a system of eccentric connecting rods and cams which is constituted by: a first shaft 24 which is coupled by its ends between the front wall 22A and the rear wall 22B. The front end of the first shaft 24 being coupled to the coupling head 70 of the takeout tong head 18. A pair of circular cams 26, 28, (one front and one rear) are eccentrically connected to the first shaft 24, in a relationship one behind the other. Said circular cams 26, 28, being placed with an angular offset of approximately 45° one with respect to the other, as shown in more detail in FIGS. 10A and 10B.

A second shaft 30, parallely separated to the first shaft 24, a certain distance X1, and aligned on the same horizontal axis. The second shaft 30 being coupled by its ends between the front wall 22A and the rear wall 22B. The second shaft 30 being coupled to freely rotate on its own axis between the front wall 22A and the rear wall 22B of housing 22. A pair of circular cams 32, 34, (one front and one rear) are eccentrically connected to the first shaft 30, in a relationship one behind the other. Said circular cams 32, 34, being placed with an angular offset of approximately 45° one with respect to the other, as shown in more detail in FIGS. 11A and 11B.

A pair of connecting bars or connecting rods 36, 38, which are respectively connected to the front circular cams 26, 32 and with the rear circular cams 28, 34. The connecting bar or connecting rod 36 by connecting the front circular cams 26, 32 and the connecting bar or connecting rod 38 by connecting the rear circular cams 28, 34. This arrangement allows the first shaft 24 to move with an angular translation movement with respect to the second shaft 30. In this way, housing 22, which is coupled with servomotor 14 (as described below) will move 180° angularly, between a first position A, in the position of the final forming mold of a glass article, to a front position B towards the front of the article forming machine. The housing 22 will be supported to rotate on the second shaft 30 and will transmit the movement to the connecting bars or connecting rods 36, 38. The arrangement of shafts 24, 30, cams 26, 28 and connecting bars or connecting rods 36, 38, produces a translation movement of the housing 22 around the second shaft 30.

Figure 5:
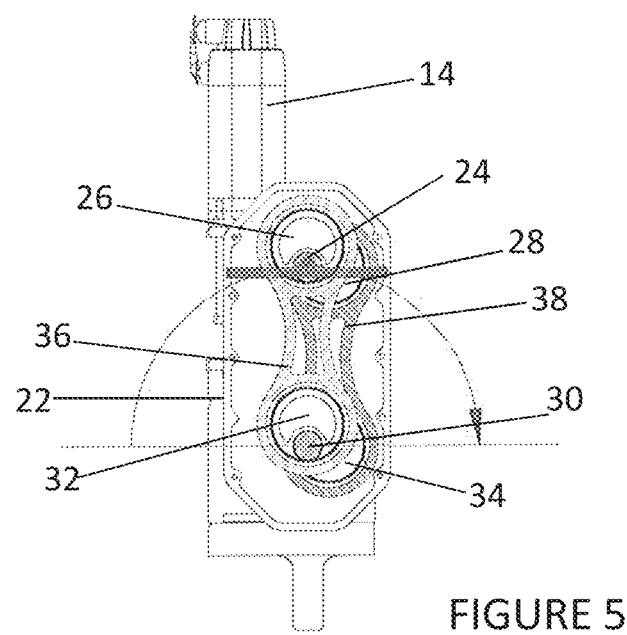
Figure 6:
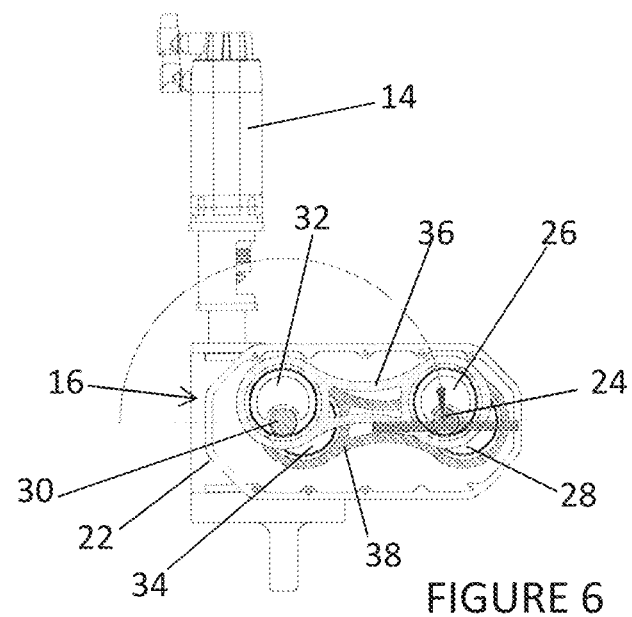
Figure 7:
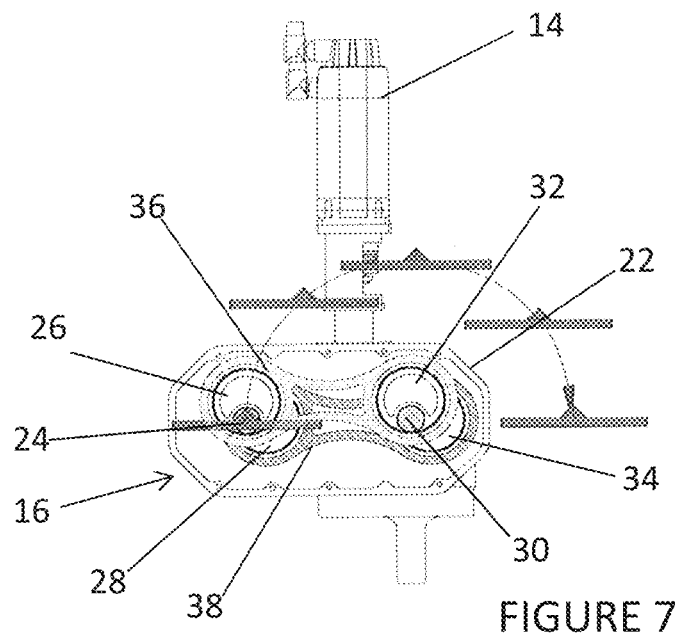

As shown schematically in FIGS. 4 to 7, housing 22, in a first position, is located horizontally, e.g. in the position of the final forming mold of a glass article (position A). In FIGS. 5 and 6, housing 22 moves with a 180° clockwise angular movement between the first position A and a front position B towards the front of the article-forming machine. FIG. 7 shows the return path of housing 22, counterclockwise to initiate a new transfer cycle of glassware. However, as can be seen in figures above, the two shafts 24, 30 always maintain their linearity throughout their translation process.

Figure 8:
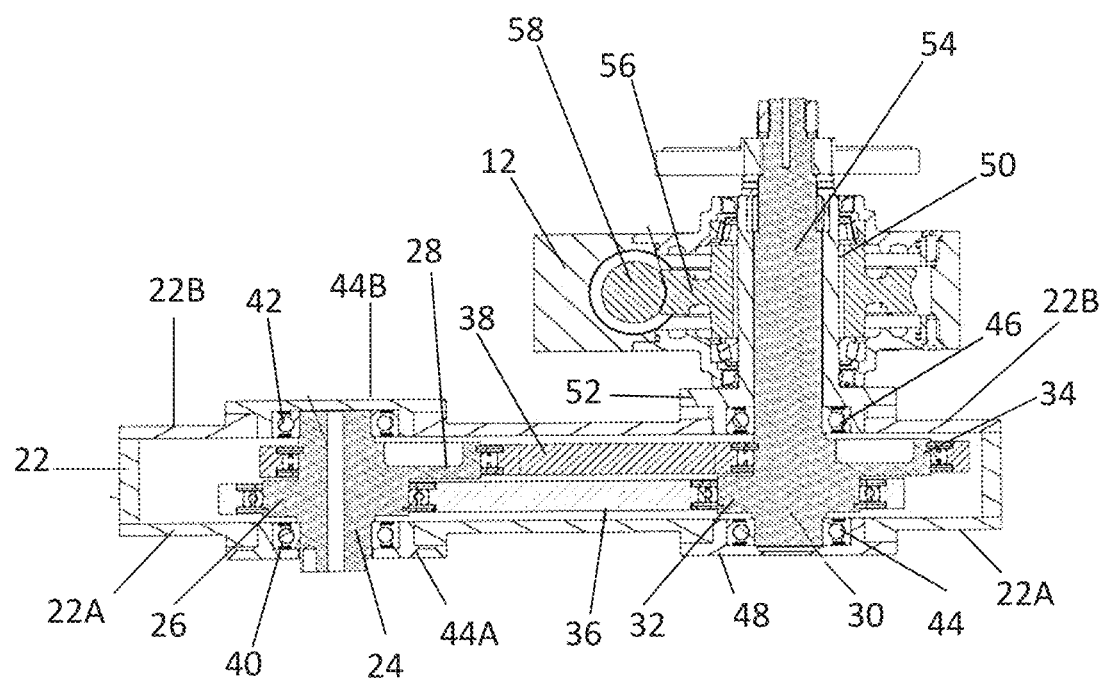
FIG. 8 is a sectional view, seen from above, of the eccentric connecting rods system of the takeout mechanism for glassware forming machines in accordance with the present invention.
Figure 9:
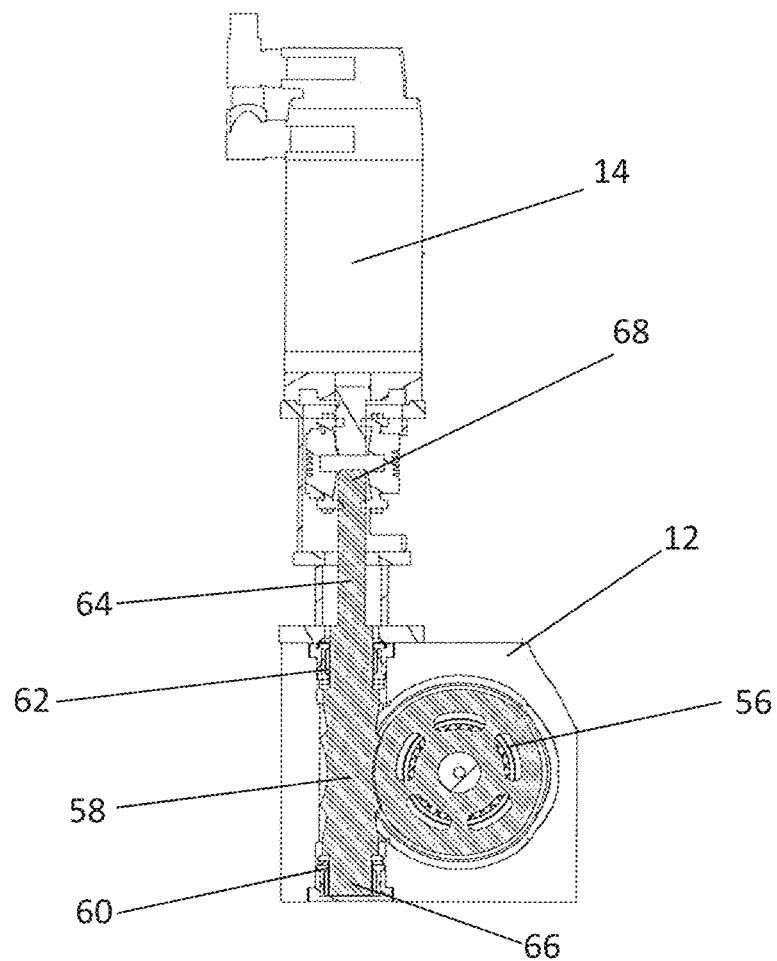
FIG. 9 is a vertical sectional view, showing the lifting mechanism to provide movement to the takeout mechanism for glassware forming machines in accordance with the present invention.

Finally, FIGS. 8 and 9 show a detailed view of the arrangement of the eccentric connecting rods and cams, and of the mechanism for providing movement to the takeout mechanism for glass article forming machines.

As can be seen in detail in FIG. 8, housing 22 includes a front wall 22A and a rear wall 22B. The first shaft 24, with its circular cams 26, 28, is coupled by its ends between the front wall 22A and the rear wall 22B between bearings 40, 42. Bearing 42 is covered with cover 44B, attached to the rear wall 22B of housing 22, while the front part is covered with a cover with a central opening 44A, which is coupled to the front wall 22A of housing 22. The front end of the first shaft 24, coincident with the front wall 22A of the housing 22, passes through the central opening of cover 44A, to connect the coupling head 70 of takeout tong head 18.

The second shaft 30, which is longer than the first shaft 24, is also coupled between the front wall 22A and the rear wall 22B between bearings 44, 46. The front end of the second shaft 30 and bearing 44 is covered with a cover 48, attached to the front wall 22A of housing 22, while the rear end of the second shaft 30 is attached to the support structure 12, to rotate freely. The connecting bars or connecting rods 36, 38, connect respectively the front circular cams 26 and 32 and each of the rear cams 28, 34, to have an angular movement with respect to the second shaft 30.

A cylindrical body or sleeve 50 having a support cover 52, is coupled to the rear wall 22B of housing 22, through said support cover 52. The rear end 54 of the second shaft 30 is inserted in said cylindrical body or sleeve 50 to rotate freely on its own axis. The support cover 52 additionally covers the bearing 46 placed on the second shaft 30.

A gear or toothed gear ring 56 is attached to the body of the sleeve 50 in such a way that when the gear 56 is driven, the sleeve 50 which is directly coupled to housing 18, rotate the housing 18 on the second shaft 30. The housing movement 18 transforms its rotating movement into a movement of translation by means of the connecting bars or connecting rods 36, 38.

Gear 56 is connected to a double-enveloped worm screw 58 (FIG. 9), which is coupled to a drive shaft 60 of servomotor 14, in such a way that by means of the movement of a servomotor 14, transmits a rotational movement to the left or to the right to carry out a 180° angular movement of the oscillating arm 16.

As shown in FIG. 9, the gear or crown gear 56 is fixedly coupled to cylinder 50 which is connected to housing 22. The gear or neck ring 56 being connected to the double-enveloped worm screw 58, that is, under this concept, the worm screw 58 surrounds gear or crown gear 56, which increases the load capacity providing greater contact to the gear teeth area 56, which allows to increase the torque without increasing its size. Worm screw 58 is coupled to rotate on support structure 12, between a lower bearing 60 and a upper bearing 62, located on support structure 12.

Shaft 64 has a lower end 66 and an upper end 68, said shaft 64 being located upright in support structure 12 to rotate on its own axis with a rotational movement to the left or to the right. Lower end 66 of shaft 64 being fixedly coupled to the double-envelope worm screw 58 and the upper end of shaft 64 being connected to the servo motor 14. Servomotor 14 provides a rotational movement to shaft 64 and worm screw 58 and thus providing a movement to the gear or crown gear 56.

The rotational movement of gear or crown gear 56, which is coupled to cylinder or sleeve 50 will provide to housing 22 an angular movement of 180° between the first position A and a front position B and vice versa, as described above.

Even though a specific embodiment of a takeout mechanism has been described for glassware forming machines, it will be evident to the experts in the field that many other characteristics or improvements could be made, which can be considered within the field determined by the following claims.

The invention claimed is:

1. A takeout mechanism for glassware forming machines comprising:
    a supporting structure;
    drive means comprising a servomotor coupled to the supporting structure;
    an oscillating arm comprising a first end and a second end, said oscillating arm being coupled in the first end, in pivoting form, with the drive means, said drive means being able to move said oscillating arm with an angular movement between a first position and a second position; and,
    a takeout tong head being coupled at the second end of the oscillating arm, which moves in a dependent relationship with an oscillatory movement of said oscillating arm, wherein the oscillating arm comprises:
    a hollow housing, which has a front wall and a rear wall;
    a first fixed axis internally coupled at a first end of the hollow housing, which is located horizontally between the front wall and the rear wall of said hollow housing, a first end of the first fixed axis being projected out of the hollow housing to be coupled to the supporting structure;
    first cam means coupled to the first fixed axis;
    a second rotating axis coupled at a second end of the hollow housing and located horizontally between the front wall and the rear wall of the hollow housing, said second rotating axis being spaced parallel to the first fixed axis, one end of the second rotating axis being coupled in direct relation with the takeout tong head;
    second cam means coupled to said second rotating axis; and,
    linkage means pivotally connecting said first cam means of said first fixed axis and said second cam means of said second rotating axis, in such a way that, by means of movement of the drive means, the hollow housing is driven to freely rotate in its first end, on the first fixed axis and, the second rotating axis, through the linkage means, moves with an angular translation movement between said first position and said second position and vice versa.

2. The takeout mechanism for glassware forming machines as claimed in claim 1, wherein the hollow housing further comprises:
    a cylindrical body having a first end and a second end;
    a support cover, said support cover comprising a central opening formed at the first end of the cylindrical body, said support cover being fixed at the rear wall of said hollow housing, said cylindrical body and support cover being coupled to rotate on said first fixed axis; and,
    a gear fixedly coupled to the cylindrical body, said gear being connected with the drive means to rotate said hollow housing on said first fixed axis.

3. The takeout mechanism for glassware forming machines as claimed in claim 1, wherein:
    the first cam means is a first front cam and a second rear cam, said cams being eccentrically located relative to the first fixed axis in a relationship one behind the other; and, the second cam means is a third front cam and a fourth rear cam, said third front cam and said fourth rear cam being located eccentrically relative to the second rotating axis in a relation one behind the other;

wherein said linkage means are respectively coupled with the first front cam of the first fixed axis and the third front cam of the second rotating axis, and, with the second rear cam of the first fixed axis and the fourth rear cam of the second rotating axis.

4. The takeout mechanism for glassware forming machines as claimed in claim 3, wherein the first front cam and the second rear cam are positioned with an angular offset of approximately 45° in one relationship to the other.

5. The takeout mechanism for glassware forming machines as claimed in claim 3, wherein the third front cam and the fourth rear cam are positioned with an angular offset of approximately 45° in one relationship to the other.

6. The takeout mechanism for glassware forming machines as claimed in claim 1, where the first cam means and the second cam means are circular cams.

7. The takeout mechanism for glassware forming machines as claimed in claim 1, where the drive means comprise:
- a worm screw located in the supporting structure, said worm screw being located to rotate freely on the supporting structure;
- a rotating shaft comprising a first end and a second end, the worm screw being fixedly connected to the first end of the rotating shaft, said rotating shaft being placed in the supporting structure to rotate on the rotating shaft's own axis with a rotational movement left or right relative to the rotating shaft's own axis; and,
- a motor connected at the second end of the rotating shaft to simultaneously provide rotational movement to the rotating shaft and the worm screw.

8. The takeout mechanism for glassware forming machines as claimed in claim 7, where the worm screw is a double-envelope type.

\* \* \* \* \*